April 3, 1934. J. KRAUS 1,953,561

DEVICE FOR LOCKING THE PLATEN OF TYPEWRITERS

Filed June 29, 1931

J. Kraus
INVENTOR

Patented Apr. 3, 1934

1,953,561

UNITED STATES PATENT OFFICE 1,953,561

DEVICE FOR LOCKING THE PLATEN OF TYPEWRITERS

Johann Kraus, Vienna, Austria, assignor, by mesne assignments, to Heindl & Petters, Vienna, Austria, a company of Austria Application June 29, 1931, Serial No. 547,738
In Austria July 5, 1930

5 Claims. (Cl. 197—141)

This invention relates to improvements in devices for locking the platen of typewriters after a predetermined number of lines has been typed on the paper.

One object of the present invention is to provide an improved construction of the device which is more simple and robust than those hitherto proposed.

The device according to the present invention comprises a shaft, two discs loosely mounted on said shaft and forming a casing, an adjusting ring mounted freely rotatable on and extending into said casing, an internal toothing fixed to said ring, a second internal toothing rotatably arranged in said casing, a stop arranged in the teeth of the toothing first mentioned, a second stop fixed to the first toothing and laterally extending therefrom, a stop secured to the second toothing and extending into the path of movement of the laterally extending stop, a locking member passing through one of the casing-discs and in its operative position engaging the teeth of the second toothing, a second shaft secured to the other casing-disc, an intermediate toothed wheel mounted freely rotatable on the second shaft and meshing with the first toothing, a spring arranged on the second shaft, one end of said spring being fixed to the latter while the other end thereof is connected with said toothed wheel, said spring having the tendency to automatically turn said toothed wheel and thus the first toothing into the initial position, and a pinion slidably mounted on the shaft of the casing but secured against rotation thereon, said pinion on being placed in mesh with said toothed wheel establishing operative connection between the locking device and the platen.

Figure 2:
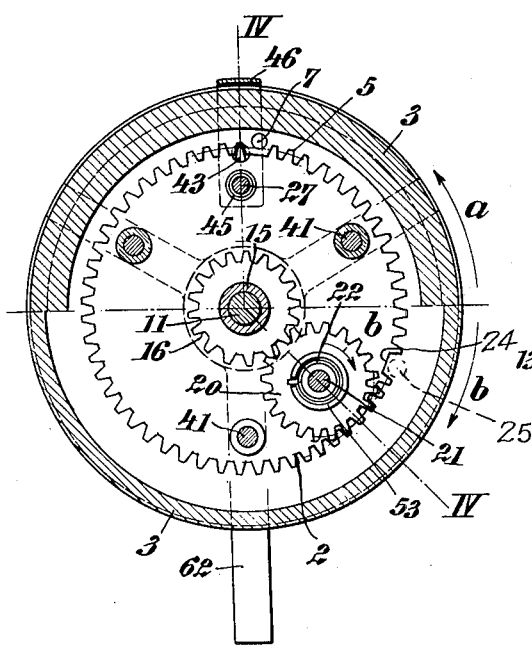
Figure 1:
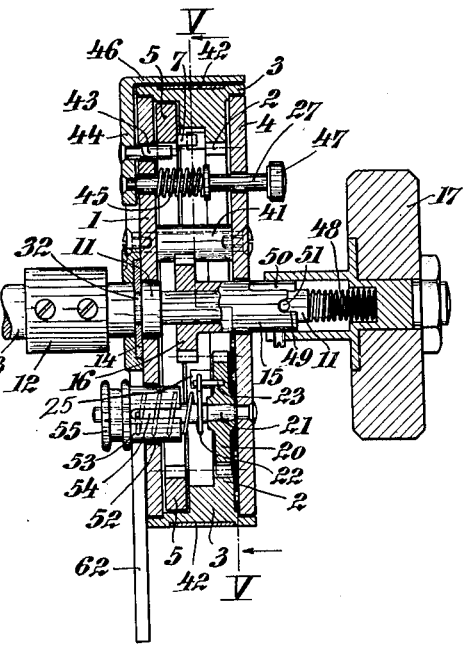

In the accompanying drawing,

Fig. 1 is a vertical section through a locking device, the section being taken on line IV—IV of Fig. 2, while Fig. 2 is a cross-sectional view thereof, the section being taken on line V—V of Fig. 1.

The locking device comprises two supporting discs 1 and 4 which constitute the casing, are connected with one another by distancing bolts 41 and around which is arranged the rotatable adjusting ring 3, provided on its outside with a removable tape 42, carrying a scale or divisions. The adjusting ring 3 and the internal toothing 2 form a unit, the latter being in mesh with the intermediate toothed wheel 20, which is subjected to the action of a return-spring 22. The toothing 2 is interrupted to form a stop 24 which is adapted to co-operate with a tooth of the intermediate toothed wheel 20 and indicates the initial position of the locking device. A second internal toothing 5 is rotatably arranged in the adjusting ring and is interrupted to form a stop and at this place provided with a laterally projecting pin 7, which extends into the path of movement of a pin 25, secured at the interrupted place of the internal toothing 2. The pin 7 limits the path of movement necessary for feeding the lines of the adjusting ring 3 according to the adjustment of the internal toothing 5.

A pin 43, passing through the casing-disc 1, secures the adjusting toothing 5 and is fixed to an arm of a bracket 44, which is subjected to the action of a spring 45, the pin being continuously forced into the toothing 5 by the said spring. The arm of the bracket 44, arranged across the outside of the adjusting ring 3, also forms a pointer 46 for indicating the set line. The bracket 44 is secured to a shaft 27, which is slidably mounted in the casing-discs 1 and 4 and against the action of the spring 45 arranged on the shaft 27 between a collar and the casing-disc 1; the said shaft and thus also the bracket 44 can be pushed to the left hand side, thereby interrupting the engagement between the pin 43 and the adjusting toothing 5. A knob 47 is secured to the end of the shaft 27 projecting out of the casing-disc 4, in order to facilitate the operation of the said shaft.

A pinion 16 controls the feed of the lines of the locking device. This pinion is mounted axially slidable on the casing-shaft 11, but is secured against rotation with respect to the latter.

The boss 15 of the pinion 16 is rigidly connected with the feed-knob 17. A compression spring 48 is mounted in a recess of the feed-knob 17 and bears against the casing-shaft 11, whereby the pinion 16 is held in mesh with the intermediate toothed wheel 20. The boss 15 of the pinion 16 is furnished with two longitudinal slots 49, 50 of different lengths, which are adapted to be engaged by a pin 51 of the casing-shaft 11 in such a manner, that if the said pin 51 engages the short slot 49 of the pinion-boss 15, the pinion 16 is held out of mesh with the intermediate toothed wheel 20. In case the pin 51 engages the long slot 50 of the boss 15, the pinion 16 is placed in mesh with the intermediate toothed wheel 20 by the spring 48. In order to engage or disengage the locking device with the platen, the feed-knob 17 is shifted on the casing-shaft 11 against the action of the spring 48, until one of both slots 49 or 50 of the boss 15 slides off of the pin 51 of the casing-shaft 11 and permits a small rotation of the feed-knob 17. After releasing the latter, the boss 15 with the pinion 16 are automatically fed by the spring 48, in accordance with the length of the set slot 49 or 50, towards the pin 51 which secures radially and axially immovable the pinion 16 of the casing-shaft 11.

A sleeve 53 is removably arranged on the shaft 21, secured to one of the casing-discs and extending through an opening 52 of the casing-disc 1, in order to adjust or readily remove the return-spring 22 attached to a pin 23 of the intermediate toothed wheel 20. The sleeve 53 is provided with a longish slot 54, which is engaged by the second end of the spring 22. The latter can be placed in tension to the desired extent by turning the sleeve 53, which is secured by a nut 55, screwed to the shaft 21 of the toothed wheel 20.

The locking device operates in the following manner:—

Supposing the locking device is set at zero, e. g., the adjusting ring and the stop 24 of its internal toothing 2 co-operate with the toothed wheel 20, and the stop 7 of the adjusting toothing 5, locked by the locking pin 43, is disposed directly in front of the stop 25 of the toothing 2 connected with the adjusting ring 3. The pinion 16 is disengaged and thus also the locking device is disengaged with respect to the platen.

Supposing thirty six lines are to be typed on a sheet. In order to attain this object, when it is desired to disengage the locking pin 43 of the toothing 5, the knob 47 is forced inward and the adjusting ring 3 is rotated in the direction of the arrow $a$ until a mark (not shown) on the outside of said ring is disposed in alignment with the fixed pointer 46. In this moment the lock is released by hand, so that the pin 43 automatically engages between the teeth of the toothing 5 in view of the action of the spring 45. During the engagement of the locking pin 43, the adjusting ring 3, which now is released, is automatically returned into its initial position by being turned in the direction of the arrow $b$ by the return-spring.

After the paper is inserted, the feed-knob 17 is disengaged and turned whereby, in view of the action of the spring 48, the pinion 16 is automatically moved in mesh with the intermediate toothed wheel 20 and thus couples the locking device with the platen.

Now the lines are fed whereby the adjusting ring is fed, in the direction of the arrow $a$ against the action of the return-spring, until said mark and the pointer 46 coincide. If an attempt is made to further feed the device, the stop 25 of the adjusting ring 3 strikes the stop 7 of the adjusting toothing 5 fixed by the lock, and now the locking device is operative and thus the platen is locked.

If it is desired to interrupt the coupling between the locking device and the platen, the feed-knob is forced inward against the action of the spring 48 and turned, whereby the pinion 16 is placed out of engagement with the intermediate toothed wheel 20. Now the return-spring 22 becomes operative and turns the adjusting ring 3 with its toothing 2 into the direction of the arrow $b$ until its initial position is reached, while the toothing 5 remains locked at the set thirty six lines by the locking pin 43. In view thereof it is possible to type thirty six lines on any number of sheets without having to adjust the toothing 5.

If it is desired to type a smaller number of lines than already set, it is necessary to return the toothing 5 into the initial position. This object is attained in that the adjusting ring 3 is turned in the direction of the arrow $a$ against the action of the return-spring 22 until the two stops 25 and 7 contact with each other, and hereafter the toothing 5 is released by disengaging the locking pin 43 and, after releasing the spring-controlled adjusting ring 3, the latter returns the toothing 5 into the initial position in view of the friction between the latter and said ring. Now the smaller number of lines can be set by means of the adjusting ring 3 in the manner already described.

Thus it will be seen, that the locking device can be easily manufactured and handled and can be readily fitted to any kind of typewriter with platen.

The locking device is engaged and disengaged by means of the feed-knob, whereby the handling is rendered very simple. The locking device is constructed in such a manner, that it can be fitted to the right or the left hand side of the platen or carriage according to the type of typewriter.

I claim:—

1. Device for locking the platen of typewriters, comprising in combination a shaft, two discs loosely mounted on said shaft and forming a casing, an adjusting ring mounted freely rotatable on and extending into said casing, an internal toothing fixed to said ring, a second internal toothing rotatably arranged in said casing, a stop arranged in the teeth of the toothing first mentioned, a second stop fixed to the first toothing and laterally extending therefrom, a stop secured to the second toothing and extending into the path of movement of the laterally extending stop, a locking member passing through one of the casing-discs and in its operative position engaging the teeth of the second toothing, a second shaft secured to the other casing-disc, an intermediate toothed wheel mounted freely rotatable on the second shaft and meshing with the first toothing, a spring arranged on the second shaft, one end of said spring being fixed to the latter while the other end thereof is connected with said toothed wheel, said spring having the tendency to automatically turn said toothed wheel and thus the first toothing into the initial position, and a pinion slidably mounted on the shaft of the casing but secured against rotation thereon, said pinion on being placed in mesh with said toothed wheel establishing operative connection between the locking device and the platen.

2. Device for locking the platen of typewriters as claimed in claim 1, further comprising a bolt slidably extending through both casing-discs, an arm secured to said bolt, a locking pin secured to said arm and extending through said casing-discs, said locking pin engaging the teeth of the internal toothing rotatably arranged in the casing, and a spring arranged on said bolt and having the tendency to maintain the locking pin in engagement with said internal toothing.

3. Device for locking the platen of typewriters as claimed in claim 1, further comprising a sleeve non-rotatably but slidably arranged on the shaft of the intermediate toothed wheel, a longitudinally extending slot in said sleeve engaged by one end of the spring of the intermediate toothed wheel, and a nut screwed to the shaft of the latter and securing the sleeve on the shaft of said toothed wheel.

4. Device for locking the platen of typewriters as claimed in claim 1, further comprising a feed-knob provided with a recess and secured to the boss of the pinion, a pressure-spring arranged in the recess of said feed-knob and bearing against the shaft of the casing, a pin fixed to said shaft, and slots of different lengths in the boss of said pinion and engaged by said pin of the casing-shaft.

5. Device for locking the platen of typewriters as claimed in claim 1, further comprising a member provided with a number of arms and fixed to one of the casing-discs, one of said arms being longer than the other arms of said member for securing the device to the carriage of the typewriter.

JOHANN KRAUS.